US009365460B2

(12) United States Patent
Greenwood et al.

(10) Patent No.: US 9,365,460 B2
(45) Date of Patent: Jun. 14, 2016

(54) PIGMENT DISPERSION

(75) Inventors: Peter Greenwood, Göteborg (SE); Hans Lagnemo, Göteborg (SE)

(73) Assignee: Akzo Nobel N.V., Arnhem (NL)

( * ) Notice: Subject to any disclaimer, the term of this patent is extended or adjusted under 35 U.S.C. 154(b) by 303 days.

(21) Appl. No.: 11/936,372

(22) Filed: Nov. 7, 2007

(65) Prior Publication Data
US 2008/0295738 A1 Dec. 4, 2008

Related U.S. Application Data

(60) Provisional application No. 60/857,979, filed on Nov. 9, 2006.

(51) Int. Cl.
| *C04B 14/04* | (2006.01) |
| *C09C 1/36* | (2006.01) |
| *C09C 1/28* | (2006.01) |
| *C04B 40/00* | (2006.01) |
| *B82Y 30/00* | (2011.01) |
| *C09C 1/30* | (2006.01) |
| *C04B 103/54* | (2006.01) |

(52) U.S. Cl.
CPC ............. C04B 40/0039 (2013.01); B82Y 30/00 (2013.01); C09C 1/3045 (2013.01); C09C 1/3081 (2013.01); C01P 2004/51 (2013.01); C01P 2004/61 (2013.01); C01P 2004/62 (2013.01); C01P 2004/64 (2013.01); C01P 2006/12 (2013.01); C04B 2103/54 (2013.01)

(58) Field of Classification Search
CPC .... C04B 14/062; C04B 14/305; C04B 24/42; C04B 2103/54; C09C 1/3045; C09C 1/3081; C01P 2004/51; C01P 2004/61; C01P 2004/62; C01P 2004/64
USPC ............................ 106/482, 446; 523/177, 122
See application file for complete search history.

(56) References Cited

U.S. PATENT DOCUMENTS

| 2,630,410 | A | | 3/1953 | Clapsadle et al. ............. 252/313 |
| 4,537,655 | A | | 8/1985 | Henriksson et al. ............. 162/23 |
| 4,927,749 | A | | 5/1990 | Dorn ................. 435/2 |
| 4,964,954 | A | | 10/1990 | Johansson .................. 162/164.6 |
| 5,068,056 | A | * | 11/1991 | Robb ............... 516/90 |
| 5,304,240 | A | * | 4/1994 | Alberto ....................... 106/217.7 |
| 5,368,833 | A | | 11/1994 | Johansson et al. ............ 423/338 |
| 5,376,372 | A | | 12/1994 | Okpanyi et al. ............. 424/195.1 |
| 5,695,609 | A | | 12/1997 | Petander et al. ............ 162/164.1 |
| 5,785,810 | A | | 7/1998 | Salminen ....................... 162/60 |
| 5,886,069 | A | | 3/1999 | Bolt ................ 523/223 |
| 6,077,394 | A | | 6/2000 | Spence et al. ............. 162/164.3 |
| 7,081,184 | B2 | | 7/2006 | Wester et al. ..................... 162/90 |
| 2003/0027884 | A1 | * | 2/2003 | Kim et al. ....................... 522/81 |
| 2003/0029590 | A1 | * | 2/2003 | Tanabe et al. ................. 162/158 |
| 2003/0213568 | A1 | | 11/2003 | Wester et al. ..................... 162/7 |
| 2004/0097600 | A1 | * | 5/2004 | Greenwood et al. ............ 516/86 |
| 2004/0138331 | A1 | * | 7/2004 | Lines et al. .................... 523/122 |
| 2008/0063803 | A1 | * | 3/2008 | Li et al. ...................... 427/372.2 |

FOREIGN PATENT DOCUMENTS

| EP | 0 060 104 B1 | 9/1982 | ............... D21C 9/00 |
| EP | 0 491 879 B1 | 7/1992 | ............ C01B 33/146 |
| EP | 0 861 299 B1 | 9/1998 | ............... C09C 1/36 |
| EP | 0 983 322 B1 | 3/2000 | ............... C09C 1/36 |
| EP | 1 584 743 A1 | 10/2005 | ............... D21F 1/74 |
| JP | 9-227812 | 9/1997 | ............. C09D 11/00 |
| JP | 2004237639 A | 8/2004 | |
| JP | 2004338114 A | 12/2004 | |
| JP | 2006503156 A | 1/2006 | |
| JP | 2006-282770 | 10/2006 | ............... C09D 5/14 |
| WO | WO 91/00735 | 1/1991 | ............. A61K 35/78 |
| WO | WO 97/18268 | 5/1997 | ............... C09C 1/36 |
| WO | WO 98/50472 | 11/1998 | ............... C09C 1/36 |
| WO | 2004035474 A1 | 4/2004 | |
| WO | WO 2004/035474 A1 | 4/2004 | ............. C01B 33/18 |

OTHER PUBLICATIONS

Korean Office Action for corresponding Korean Application No. 10-2009-7007371 dated Nov. 15, 2013.
English-Language Translation of Japanese Office Action for corresponding Japanese Application No. 2009-536200 dated Nov. 26, 2013.
European Search Report for Application No. EP 06 12 3767 dated Apr. 11, 2007.
International Search Report for International Application No. PCT/SE2007/050588 dated Nov. 23, 2007.
Written Opinion of International Application No. PCT/SE2007/050588 dated Nov. 23, 2007.
Derwent abstract abstracting JP 2006-282770, Oct. 2006.
Computer-generated translation into English for JP 2006-282770, Oct. 2006.
Patent Abstracts of Japan abstracting JP 9-227812, Sep. 1997.
Iler, Ralph K., "The Chemistry of Silica," John Wiley & Sons (1979) pp. 407-409.
Iler, R. K. et al., "Degree of Hydration of Particles of Colloidal Silica in Aqueous Solution," J. Phys. Chem., vol. 60 (1956) pp. 955-957.

* cited by examiner

*Primary Examiner* — Helene Klemanski
(74) *Attorney, Agent, or Firm* — Norris McLaughlin & Marcus, P.A.

(57) ABSTRACT

The invention relates to a method of producing a substantially aqueous pigment dispersion substantially free from an organic binder comprising mixing at least one water-soluble or water-dispersible silane compound and colloidal silica particles to form silanized colloidal silica particles in an aqueous dispersion whereby said at least one silane compound is mixed with colloidal silica particles in a weight ratio of silane to silica of from about 0.2 to about 1.5, mixing said silanized colloidal silica particles with an organic and/or inorganic pigment, wherein the weight ratio of silica to pigment is from about 0.001 to about 0.8 to form said substantially aqueous pigment dispersion. The invention also relates to an aqueous pigment dispersion obtained from the method defined herein.

15 Claims, No Drawings

PIGMENT DISPERSION

The present invention relates to an aqueous pigment dispersion, a method of providing said dispersion, and the use thereof.

BACKGROUND OF THE INVENTION

Inorganic pigments are often incorporated in various polymers as whiteners, tinting agents, or opacifiers. Pigments such as $TiO_2$ are particularly useful for these purposes because it scatters light very efficiently. Such pigments may be present in pigment dispersions known from e.g. U.S. Pat. No. 5,886,069 disclosing $TiO_2$ particles with discrete inorganic particles dispersed on the surface of the $TiO_2$ particles. However, such dispersions are not always sufficiently stable and do not allow storing for a longer period of time without suffering from destabilization or gelling resulting in considerably lowered light scattering efficiency. Such dispersions may also suffer from optical crowding provided the $TiO_2$ particles are contacted with each other too closely. As a result thereof, hiding power and tinting strength may become considerably reduced. Extenders have been added to paint formulations to space the $TiO_2$ particles to preserve scattering efficiency. However, distribution of extenders is difficult and the hiding power is affected. It would be desirable to provide an aqueous pigment dispersion in the absence of dispersants such as surfactants. Surfactants may impart foaming problems to the dispersion which in turn may deteriorate water and chemical resistance.

WO 2004/035474 A1 discloses silanized colloidal silica particles in conjunction with an organic binder. Organic binders, however, may disturb the stability of a pigment dispersion. The process of dispersing pigment in the presence of organic binders may also require an additional energy input since higher shear forces may be necessary. Furthermore, the presence of organic binders reduces the amount of pigment dispersible which in turn reduces the resulting light scattering efficiency.

The present invention relates to a facilitated method of providing an aqueous pigment dispersion having improved stability. One further object of the invention is to provide a method of enabling longer storage and shelf life, and which provides for acceptable pigment properties such as light scattering efficiency when admixed in any formulation including paints.

THE INVENTION

The present invention relates to a method of producing a substantially aqueous pigment dispersion substantially free from an organic binder comprising mixing at least one water-soluble or water-dispersible silane compound and colloidal silica particles to form silanized colloidal silica particles in an aqueous dispersion whereby said at least one silane compound is mixed with colloidal silica particles in a weight ratio of silane to silica from about 0.2 to about 1.5, mixing said silanized colloidal silica particles with an organic and/or inorganic pigment, wherein the weight ratio of silica to pigment is from about 0.001 to about 0.8 to form said substantially aqueous pigment dispersion.

By the term "essentially or substantially free from an organic binder" is meant an organic binder content in the aqueous pigment dispersion below about 15, for example below about 10 or below about 5, for example below about 3 or below about 1 or below about 0.1 wt %. Thus, according to one embodiment, the dispersion is produced in such a way that the obtained dispersion contains amounts of organic binder below said stated limits.

According to one embodiment, silane and colloidal silica particles are admixed in a weight ratio of silane to silica ranging from about 0.25 to about 1.5, for example from about 0.3 to about 1.2, or from about 0.35 to about 0.8, or from about 0.4 to about 0.8.

Silane compounds may form stable covalent siloxane bonds (Si—O—Si) with the silanol groups or be linked to the silanol groups, e.g. by hydrogen bondings on the surface of the colloidal silica particles.

According to one embodiment, the mixing of silane and colloidal silica particles may be carried out continuously, for example at a temperature from about 20 to about 95, or from about 50 to about 75, such as from about 60 to about 70° C. Silane may be slowly added to the silica particles under vigorous agitation at a controlled rate, which suitably is from about 0.01 to about 100, for example from about 0.1 to about 10, or from about 0.5 to about 5, such as from about 1 to about 2 silane molecules per $nm^2$ colloidal silica surface area (on the colloidal silica particles) and hour. The addition of silane can be continued for any suitable time depending on the addition rate, amount of silane to be added, and degree of desired silanisation. However, the addition of silane may be continued up to about 5 hours, for example up to about 2 hours until a suitable amount of silane has been added. The amount of added silane to the colloidal silica particles suitably is from about 0.1 to about 6, for example from about 0.3 to about 3, or from about 1 to about 2 silane molecules per $nm^2$ surface area of the colloidal silica particles.

The mixing of silane and silica may be carried out at a pH from about 1 to about 13, for example from about 6 to about 12, or from about 7.5 to about 11, or from about 9 to about 10.5.

Colloidal silica particles, also referred to as silica sols herein, may be derived from e.g. precipitated silica, micro silica (silica fume), pyrogenic silica (fumed silica) or silica gels with sufficient purity, and mixtures thereof.

Colloidal silica particles and silica sols may be modified and can contain other elements such as amines, aluminium and/or boron, which can be present in the particles and/or the continuous phase. Boron-modified silica sols are described in e.g. U.S. Pat. No. 2,630,410. The aluminium modified silica particles suitably have an $Al_2O_3$ content of from about 0.05 to about 3 wt %, for example from about 0.1 to about 2 wt %. The procedure of preparing an aluminium modified silica sol is further described in e.g. "The Chemistry of Silica", by Iler, K. Ralph, pages 407-409, John Wiley & Sons (1979) and in U.S. Pat. No. 5,368,833.

The colloidal silica particles employed suitably have an average particle diameter ranging from about 2 to about 150, for example from about 2 to about 100, or from about 3 to about 50, or from about 4 to about 40, or from about 4 to about 15, or from about 5 to about 12 nm. Suitably, the colloidal silica particles have a specific surface area from about 20 to about 1500, for example from about 50 to about 900, or from about 70 to about 600, or from about 200 to about 500 $m^2/g$.

The colloidal silica particles may have a narrow particle size distribution, i.e. a low relative standard deviation of the particle size. The relative standard deviation of the particle size distribution is the ratio of the standard deviation of the particle size distribution to the mean particle size by numbers. The relative standard deviation of the particle size distribution may be lower than about 60% by numbers, for example lower than about 30% by numbers, or lower than about 15% by numbers.

The colloidal silica particles are suitably dispersed in an aqueous solvent, suitably in the presence of stabilising cations such as $K^+$, $Na^+$, $Li^+$, $NH_4^+$, organic cations, primary secondary, tertiary, and quaternary amines, or mixtures thereof so as to form an aqueous silica sol. However, also colloidal silica dispersed in partially organic dispersions including e.g. lower alcohols, acetone or mixtures thereof may be used, wherein the volume of the organic portion suitably is in an amount of from about 1 to about 20, for example from about 1 to about 10, or from about 1 to about 5% by volume of the total aqueous and organic volume. According to one embodiment, the colloidal silica particles are negatively charged. Suitably, the silica content in the sol is from about 1 to about 80, for example from about 5 to about 80 or from about 10 to about 80, e.g. from about 20 to about 80, for example from about 25 to about 70, or from about 30 to about 60 wt %. The pH of the silica sol suitably is from about 1 to about 13, for example from about 6 to about 12, or from about 7.5 to about 11. However, for aluminium-modified silica sols, the pH suitably is from about 1 to about 12, or from about 3.5 to about 11.

The silica sol may have an S-value from about 20 to about 100, for example from about 30 to about 90, or from about 60 to about 90.

The S-value characterises the extent of aggregation of colloidal silica particles, i.e. the degree of aggregate or microgel formation. The S-value has been measured and calculated according to the formulas given in J. Phys. Chem. 60 (1956), 955-957 by Iler, R. K. & Dalton, R. L.

The S-value depends on the silica content, the viscosity, and the density of the colloidal silica particles. A high S-value indicates a low microgel content. The S-value represents the amount of $SiO_2$ in percent by weight present in the dispersed phase of e.g. a silica sol. The degree of microgel can be controlled during the production process as further described in e.g. U.S. Pat. No. 5,368,833.

According to one embodiment, a silicate such as alkali metal silicate, e.g. sodium silicate, potassium silicate, or lithium silicate, may be admixed with silanized colloidal silica particles in order to further increase the stability. According to one embodiment, the molar ratio of silica to $M_2O$, wherein M is an alkali metal is from about 4 to about 20, for example from about 5 to about 15 such as from about 6 to about 11.

According to one embodiment, suitable silane compounds to be admixed with colloidal silica particles include epoxy silanes and silane compounds containing a glycidoxy or glycidoxypropyl group; tris-(trimethoxy)silane, octyl triethoxysilane, methyl triethoxysilane, methyl trimethoxysilane; isocyanate silane such as tris-[3-(trimethoxysilyl)propyl]isocyanurate; gamma-mercaptopropyl trimethoxysilane, bis-(3-[triethoxysilyl]propyl)polysulfide, beta-(3,4-epoxycyclohexyl)-ethyl trimethoxysilane; silanes containing an epoxy group (epoxy silane), glycidoxy and/or a glycidoxypropyl group such as gamma-glycidoxypropyl trimethoxysilane, gamma-glycidoxypropyl methyldiethoxysilane, (3-glycidoxypropyl)trimethoxy silane, (3-glycidoxypropyl) hexyltrimethoxy silane, beta-(3,4-epoxycyclohexyl)-ethyltriethoxysilane; silanes containing a vinyl group such as vinyl triethoxysilane, vinyl trimethoxysilane, vinyl tris-(2-methoxyethoxy)silane, vinyl methyldimethoxysilane, vinyl triisopropoxysilane; gamma-methacryloxypropyl trimethoxysilane, gamma-methacryloxypropyl triisopropoxysilane, gamma-methacryloxypropyl triethoxysilane, octyltrimethyloxy silane, ethyltrimethoxy silane, propyltriethoxy silane, phenyltrimethoxy silane, 3-mercaptopropyltriethoxy silane, cyclohexyltrimethoxy silane, cyclohexyltriethoxy silane, dimethyldimethyoxy silane, 3-chloropropyltriethoxy silane, 3-methacryoxypropyltrimethoxy silane, i-butyltriethoxy silane, trimethylethoxy silane, phenyldimethylethoxy silane, hexamethyldisiloxane, trimethylsilyl chloride, vinyltriethoxy silane, hexamethyldisilizane, and mixtures thereof. U.S. Pat. No. 4,927,749 discloses further suitable silanes which may be used in the present invention.

According to one embodiment, at least about 1% by number of the silanol surface groups on the colloidal silica particles are capable of binding or linking to silane groups of the silane compounds, for example at least about 5%, or at least about 10%, or at least about 30%, or at least about 50% bind or link to a silane group.

According to one embodiment, the silane compound is diluted before mixing it with the colloidal silica particles, for example with water to form a premix of silane and water, suitably in a weight ratio of silane to water from about 1:8 to about 8:1, or from about 3:1 to about 1:3, such as from about 1.5:1 to about 1:1.5. The resulting silane-water solution is substantially clear and stable and easy to mix with the colloidal silica particles. At continuous addition of silane to the colloidal silica particles, the mixing may be continued from about 1 second to about 30 minutes, or from about 1 to about 10 minutes after the addition of silane is stopped.

According to one embodiment, the pigment is inorganic. According to one embodiment, the inorganic pigment is selected from calcium carbonate, barium sulfate, iron(II,III) oxide, e.g. $Fe_3O_4$, a-$Fe_2O_3$, iron(III) oxide hydroxide, e.g. a-FeOOH, chrome(III)oxide, cobalt compounds such as cobalt aluminate, zinc oxide, zinc sulfide, basic lead sulfate, basic lead carbonate, antimony oxide, lithopone, titanium oxide, e.g. $TiO_2$ in rutile or anatase form, or mixtures thereof. According to one embodiment, the pigment may also be a clay such as kaolin or a filler material having pigment properties such as fumed silica, micro silica, precipitated silica och silica gels.

According to one embodiment, the pigment has a particle size ranging from about 10 to about 5000, e.g. from about 100 to about 1000, or from about 100 to about 500, or from about 200 to about 400 nm.

According to one embodiment, the pigment is admixed with silanized colloidal silica particles in a weight ratio of silica to pigment ranging from about 0.01 to about 0.7, for example from about 0.01 to about 0.6 or from about 0.01 to about 0.5, or from about 0.01 to about 0.4, or from about 0.01 to about 0.3, or from about 0.01 to about 0.2, or from about 0.02 to about 0.05.

According to one embodiment, a mixer, e.g. a dissolver turbine at 1400 rpm, is employed to mix a pigment with the silanized colloidal silica particles. The time of mixing may be from about 1 to about 40, for example from about 5 to 30, or for example from about 10 to 20 minutes. The mixing temperature may be from about 1 to about 80, for example from about 10 to about 60, or from about 20 to about 40° C. According to one embodiment, the radial velocity ranges from about 1 to about 50, for example from about 5 to about 35, e.g. from about 15 to about 25 m/s.

$TiO_2$ pigments being one of the enumerated pigments can be of a conventional rutile or anatase variety, produced by either a chloride or a sulfate process. According to one embodiment, rutile $TiO_2$ particles made by the chloride process with a particle size in the range of about 100 to about 500 nm are used. According to one embodiment, the $TiO_2$ particles used to prepare the $TiO_2$ pigment can be base $TiO_2$, referred to herein as $TiO_2$ particles directly removed from oxidizing $TiCl_4$ and before any finishing steps and/or before any surface treatments are applied. In the sulfate process, base TiO$_2$ refers to TiO$_2$ particles before any surface treatments are applied. Alternatively, the TiO$_2$ particles used to prepare the pigments of this invention can be finished TiO$_2$ particles, referred to herein as TiO$_2$ particles subjected to conventional finishing steps and/or surface treated with hydrous oxides such as alumina, silica, zirconia or the like, or combinations of these materials. The hydrous oxides can be up to about 16, for example up to about 10 wt % of the total TiO$_2$ pigment product weight.

The invention also relates to an aqueous pigment dispersion obtainable by the method as defined herein.

The invention also relates to an aqueous pigment dispersion being substantially free from an organic binder comprising silanized colloidal silica particles in a weight ratio of silane to silica of from about 0.2 to about 1.5 and an organic and/or inorganic pigment wherein the weight ratio of silica to pigment is from about 0.001 to about 0.8.

According to one embodiment, up to about 20, for example up to about 10 or up to about 5% by volume of a water-soluble or water-dispersible organic solvent e.g. a lower alcohol, may be contained in the prepared aqueous pigment dispersion. Such dispersion may have been formed from an aqueous dispersion comprising a certain portion of an organic solvent, e.g. a silica sol, silane compound, or pigment dispersed at least partially in an organic solvent or medium.

According to one embodiment, the pigment is inorganic. According to one embodiment, the pigment is admixed in such amount to result in a pigment content of from about 25 to about 85, e.g. from about 50 to about 80, or from about 60 to about 75 wt % in the obtained pigment dispersion. According to one embodiment, the weight ratio of silica to pigment in the obtained pigment dispersion ranges from about 0.01 to about 0.7, for example from about 0.01 to about 0.6 or from about 0.01 to about 0.5, or from about 0.01 to about 0.4, or from about 0.01 to about 0.3, or from about 0.01 to about 0.2, or from about 0.02 to about 0.05.

The total content of silica in the prepared pigment dispersion comprises silica present in modified silanized silica particles and non-modified silica particles which also may be present in the prepared dispersion. The total amount of silane compounds is based on all freely dispersed or dissolved silane compounds and all silane compounds being linked or bound via silane groups or derivatives of silane. Thus, the weight ratio of silane to silica in the prepared pigment dispersion including both free and linked or bound groups may be within the weight ratio of the silane and silica components being admixed, i.e. from about 0.25 to about 1.5, for example from about 0.3 to about 1.2, or from about 0.35 to about 0.8, or from about 0.4 to about 0.8.

According to one embodiment, the aqueous pigment dispersion comprises freely dispersed silane compounds and/or colloidal silica particles and silanized colloidal silica particles prepared from colloidal silica particles and silane compounds as disclosed herein.

According to one embodiment, the aqueous pigment dispersion comprises any of the inorganic pigments as disclosed herein. Further properties of the components comprised in the aqueous pigment dispersion may be as described in the method section.

The stability of the pigment dispersion facilitates the handling and application thereof in any use since it allows for storage and need not be prepared on site immediately before usage. The already prepared dispersion can thus easily be directly used. The dispersion is also beneficial in the sense that it does not involve hazardous amounts of toxic components.

The dispersion may contain besides silanized colloidal silica particles also, at least to some extent, non-silanized colloidal silica particles depending on the size of the silica particles, weight ratio of silane to silica, type of silane compound mixed, reaction conditions etc. Suitably, at least about 40 wt % of the colloidal silica particles are silanized, such as at least about 65, or at least about 90 or at least about 95, for example at least about 99 wt %. The dispersion may comprise besides silane in the form of silane groups or silane derivatives bound or linked to the surface of the silica particles also at least to some extent freely dispersed unbound silane compounds. Suitably, at least about 40, for example at least about 60, or at least about 75, such as at least about 90, or at least about 95 wt % of the silane compounds are bound or linked to the surface of the silica particles.

According to one embodiment, the prepared pigment dispersion can have a silica content from about 1 to about 80, e.g. from about 5 to about 80 or from about 10 to about 80 such as from about 20 to about 80, for example from about 25 to about 70, or from about 30 to about 60 wt %.

The resulting pigment dispersion is suitable for use in coating applications including architectural coatings, interior and exterior paints, stains, industrial coatings such as coil coatings, paper coatings as well as in protective coatings or in other applications including papermaking, laminate and composite materials such as paper, plastics, rubbers, concrete and cementitious systems, inks, and ceramics, e.g. ceramic tiles. The pigment dispersion may also be used on painted or non-absorbing substrates, such as glass-fiber wallpaper, to reduce or prevent bubble formation in e.g. plaster or putties.

The invention being thus described, it will be obvious that the same may be varied in many ways. The following examples will further illustrate how the described invention may be performed without limiting the scope of it.

All parts and percentages refer to part and percent by weight, if not otherwise stated.

EXAMPLES

The silica sols used had a silica content of 13.4 wt % except for samples 11 and 12 for which the silica content were 4.46 wt % before use as pigment dispersants, unless otherwise stated. The colloidal silica particles of the sols were modified with gamma-glycidoxypropyltrimethoxysilane. The silane modification was performed at 60° C. as described in patent application WO 2004/035474 A1. The different colloidal silica dispersions used in this evaluation are characterised in table 1 below which also includes a polyacrylate used in the prior art as a reference.

TABLE 1

| No. | Silica sol (particle size and degree of silane modification) |
|---|---|
| 1 | 5 nm, silane/SiO$_2$: 0.4 |
| 2 | 5 nm, silane/SiO$_2$: 0.2 |
| 3 | 4 nm, silane/SiO$_2$: 0.2 |
| 4 | 4 nm, silane/SiO$_2$: 0.4 |
| 5 | 5 nm, no silane |
| 6 | 7 nm, no silane, aluminate modified |
| 7 | 7 nm, silane/SiO$_2$: 0.2 |
| 8 | 12 nm, no silane |
| 9 | 12 nm, silane/SiO$_2$: 0.15 |
| 10 | Polyacrylate (Dispex 40 N), 0.4 wt % |
| 11 | 5 nm, silane/SiO$_2$: 0.4 |
| 12 | 5 nm, silane/SiO$_2$: 0.4 |
| 13 | 5 nm, silane/SiO$_2$: 0.4 |

Preparation of Pigment Pastes 300 g titanium dioxide (highly milled titania pigment, Tiona 595, supplied by Univar) was added under moderate agitation for about 20 seconds to 100 g of diluted silica sol according to table 1 to yield a 75 wt % pigment paste unless otherwise stated (see table 2). The pigments were dispersed for 10 minutes at 1400 rpm with a 40 mm diameter dissolver turbine to provide well-dispersed pigments. The paste numbers correspond to the number of the silica sol used as dispersant in table 1.

| Pigment paste No | Notes |
|---|---|
| 1 | Stable, constant viscosity (after 9 days) |
| 2 | Initially slightly more viscous than No 1. After 1 day: Highly viscous, thixotropic |
| 3 | Initially more viscous than No 2. Not fluid after about 1 h. After 1 day: Solid |
| 4 | Initially slightly more viscous than No 1. After 1 day: Viscous, thixotropic |
| 5 | Gels initially (after 8 minutes dispersion) |
| 6 | Gels initially (after 1 minutes dispersion) |
| 7 | The paste becomes solid after addition of about 260-270 g $TiO_2$ |
| 8 | Gels initially (after addition of $TiO_2$, before dispersion) |
| 9 | Gels initially. The paste becomes solid after addition of about 220 g $TiO_2$ |
| 10 | Thixotropic behaviour after 1 day, still fluid after 9 days, though separated phases; water on top. |
| 11 | Initially low viscous, lower than No 1, but becomes thixotropic after 3 h |
| 12 | 350 g $TiO_2$ in the paste. Gels after 15 minutes. The paste flocculates upon addition to the binder. |
| 13 | Dispersion for 20 minutes at 2000 rpm. Stable, constant viscosity (after 6 days). |

Coating Series

The pastes were incorporated into a resin emulsions to form coating compositions for optical evaluations. The resin emulsion used was Setalux® 6774, supplied by Nuplex Resins. The coating compositions prepared comprised 5, 10, 20, 30, 40 and 50 wt % titanium oxide pigment respectively in the dried coating compositions. Films were cast using a film applicator with 100 micron openings. Each coating composition contained 50 g of resin emulsion (equal to 22 g dry resin).

Evaluation of Films

Optical measurements were carried out for wavelengths in the visible range (from 300-700 nm). Reflectance of the pigmented coatings were measured by a Beckman Acta 5240 spectrophotometer equipped with an integrating sphere using barium sulfate as reflectance reference. Coating compositions based on pigment pastes 1-4, 10, 11, and 13 were evaluated. Pigment pastes 5, 6, 8, 9 and 12 as set out in table 2 gels immediately or after a short period of time whereas paste 7 becomes solid after addition of 260-270 g $TiO_2$. In this context, it can be remarked that none of pastes 5, 6 or 8 involve silanized colloidal silica particles and that the silane to silica weight ratios of 7 and 9 only are 0.2 and 0.15 respectively. Paste No. 12, on the contrary, contains an excessive amount of pigment, i.e. 350 g $TiO_2$ in the paste.

Stability of Pigment Paste

A high silane modification degree of the colloidal silica improved paste stability compared to a low modification degree; compare e.g. No 1 (high), No 2 (low), No 3 (low), and No 4 (high) in table 2. The "reference" paste No 10 that used Dispex N40, a polyacrylate, as dispersant showed tendencies of settling and paste separation.

Coating Compositions

The coating compositions were checked after 7.5 months. All samples separated. The $TiO_2$ pigment had settled to the bottom of the samples. However, coating series No 1, 4 and 13 were easy to re-disperse while coating series No 3, 10 (reference), and 11 had a much more solid "cake" at the sample bottom.

Light Scattering Efficiency of the Pigment

The discussion in this section is focusing on light scattering as integrated visible reflectance ($\lambda$: 300-700 nm wavelength range) in view of colloidal silica dispersion versus conventional polyacrylate dispersant, Dispex N40. It was possible to obtain a big increase in pigment efficiency when using colloidal silica dispersions instead of Dispex N40 as pigment dispersant at recommended dosage by supplier of 0.40 wt %; compare series No. 1 (comprising silica sol no. 1) and 10 (comprising Dispex N40, no. 10 as set out in table 1) below in table 3. This is most pronounced effect was obtained at high pigment loadings; e.g. a titania content of 30 wt % dispersed by colloidal silica gives the same reflectance in the coating film as about 40 wt % titania dispersed by Dispex N40.

TABLE 3

| | Series No. Refl Vis(%) | |
|---|---|---|
| Wt % $TiO_2$ | 1 | 10 |
| 5 | 38.55 | 31.18 |
| 10 | 47.64 | 41.99 |
| 20 | 59.20 | 53.42 |
| 30 | 61.13 | 58.27 |
| 40 | 69.52 | 61.34 |
| 50 | 67.44 | 63.66 |

Particle Size

Particle size of 5 nm, corresponding to a specific surface area of 500 m²/g, appeared to be somewhat more efficient than the particle size of 4 nm with a corresponding specific surface area of 750 m²/g in view of reflectance (compare coating series 1 and 4 in table 4).

TABLE 4

| | Series No. | |
|---|---|---|
| | 1 | 4 |
| Wt % $TiO_2$ | Refl Vis(%) | Refl Vis(%) |
| 5 | 38.55 | 34.78 |
| 10 | 47.64 | 35.06 |
| 20 | 59.20 | 57.97 |
| 30 | 61.13 | 61.94 |
| 40 | 69.52 | 64.44 |
| 50 | 67.44 | 42.90 |

Degree of Silane Modification of the Colloidal Silica Dispersions

A high degree of silane modification of the colloidal silica was also beneficial in the visible spectrum (wavelength 300-

700 nm), especially for the 5 nm particle. The reason for this phenomenon was likely depending on enhanced pigment wetting and improved stability against flocculation and spacing of the titanium oxide pigments (compare coating series 1-4 in table 5 in which silica sols 1-4 were admixed to prepare dispersions in series 1-4 respectively) even though the differences are not that pronounced for the latter coating series.

TABLE 5

| | Series No. | | | |
|---|---|---|---|---|
| Wt % TiO$_2$ | 1 Refl Vis(%) | 2 Refl Vis(%) | 3 Refl Vis(%) | 4 Refl Vis(%) |
| 5 | 38.55 | 24.79 | 17.69 | 34.78 |
| 10 | 47.64 | 42.10 | 34.84 | 35.06 |
| 20 | 59.20 | 54.52 | 52.72 | 57.97 |
| 30 | 61.13 | 62.48 | 62.56 | 61.94 |
| 40 | 69.52 | 62.75 | 64.87 | 64.44 |
| 50 | 67.44 | 63.74 | 63.17 | 42.90 |

The invention claimed is:

1. A method of producing a substantially aqueous pigment dispersion having an organic binder content less than 0.1 wt % and a total pigment content ranging from about 25 to about 85 wt %, said method comprising mixing at least one water-soluble or water-dispersible silane compound and colloidal silica particles having an average particle size in the range of about 2 to about 100 nm to form silanized colloidal silica particles in an aqueous dispersion whereby said at least one silane compound is mixed with said colloidal silica particles in a weight ratio of silane to silica of from about 0.2 to about 1.5, mixing said silanized colloidal silica particles with an organic and/or inorganic pigment, wherein the weight ratio of silica to pigment is from about 0.02 to about 0.4 to form said substantially aqueous pigment dispersion.

2. The method according to claim 1, wherein the pigment has a particle size ranging from about 10 to about 5000 nm.

3. The method according to claim 1, wherein the pigment is TiO$_2$.

4. The method according to claim 1, wherein the weight ratio of silane to silica is from about 0.25 to about 1.5.

5. The method according to claim 1, wherein the aqueous pigment dispersion contains up to about 20% by volume of a water-soluble or water-dispersible organic solvent.

6. The method according to claim 1, wherein the weight ratio of silica to pigment is from about 0.01 to about 0.2.

7. An aqueous pigment dispersion having an organic binder content less than 0.1 wt % and a total pigment content ranging from about 25 to about 85 wt %, said pigment dispersion obtained by mixing at least one water-soluble or water-dispersible silane compound and colloidal silica particles having an average particle size in the range of about 2 to about 100 nm to form silanized colloidal silica particles in an aqueous dispersion whereby said at least one silane compound is mixed with said colloidal silica particles in a weight ratio of silane to silica of from about 0.2 to about 1.5, mixing said silanized colloidal silica particles with an organic and/or inorganic pigment, wherein the weight ratio of silica to pigment is from about 0.02 to about 0.4 to form said substantially aqueous pigment dispersion.

8. The dispersion according to claim 7, wherein the weight ratio of silica to pigment is from about 0.01 to about 0.2.

9. An aqueous pigment dispersion having an organic binder content less than 0.1 wt % and a total silica content ranging from about 1 to about 80 wt % comprising silanized colloidal silica particles having an average particle size in the range of about 2 to about 100 nm, wherein the weight ratio of silane to silica in the pigment dispersion is from about 0.2 to about 1.5; and an organic and/or inorganic pigment, wherein the weight ratio of silica to pigment is from about 0.02 to about 0.4.

10. The dispersion according to claim 9, wherein the pigment has a particle size ranging from about 10 to about 5000 nm.

11. The dispersion according to claim 9, wherein the weight ratio of silane to silica is from about 0.25 to about 1.5.

12. The dispersion according to claim 9, wherein the pigment content in the dispersion is from about 25 to about 85 wt %.

13. The dispersion according to claim 9, wherein the pigment is inorganic.

14. The dispersion according to claim 9, wherein the pigment is TiO$_2$.

15. The dispersion according to claim 9, wherein the weight ratio of silica to pigment is from about 0.01 to about 0.2.

* * * * *